INVENTORS
Erwin C. Horton &
Earl V. Schaal
BY Bean, Brooks, Buckley & Bean.
ATTORNEYS.

Patented Oct. 23, 1951

2,572,727

UNITED STATES PATENT OFFICE 2,572,727

SHAFT MOUNTING FOR FLUID MOTORS

Erwin C. Horton, Hamburg, and Earl V. Schaal, East Aurora, N. Y., assignors to Trico Products Corporation, Buffalo, N. Y.

Original application July 13, 1944, Serial No. 544,766, now Patent No. 2,462,192, dated February 22, 1949. Divided and this application March 13, 1948, Serial No. 14,703

6 Claims. (Cl. 121—1)

This invention relates to the fluid motor art and especially to that type employed in the windshield cleaner field, wherein motors of various designs and operational characteristics are required to meet the factory specifications and demands of the several motor car builders, this application being a division of an earlier copending application, now Patent No. 2,462,192.

The primary object of the present invention is to provide a motor construction which may more readily be adapted to the various needs of the user. More particularly it has for its object to provide a fluid motor which is more universal in its application.

Again, the invention has for its object to provide a fluid motor of this character which is efficient in operation and practical in use.

Figure 1:
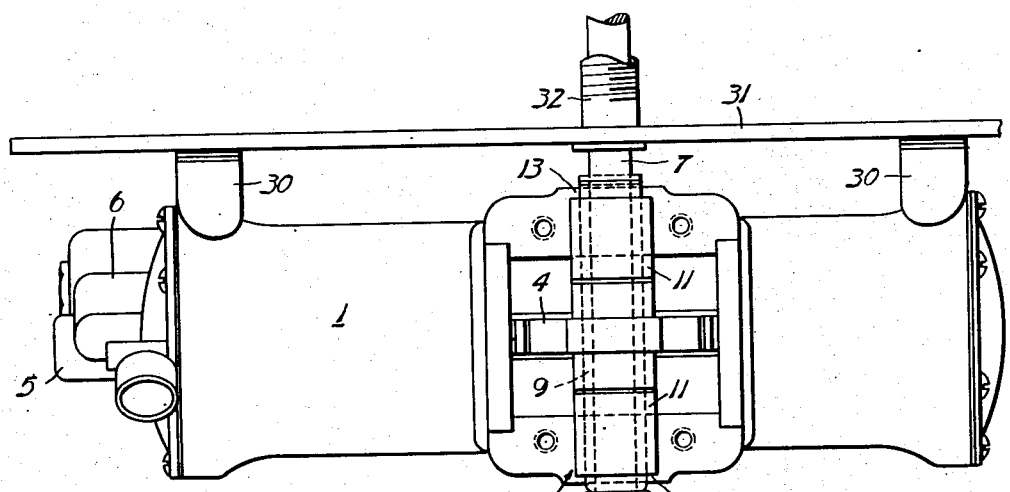
Fig. 1 is a top plan view of a motor embodying the present invention, with the closure removed.
Figure 2:
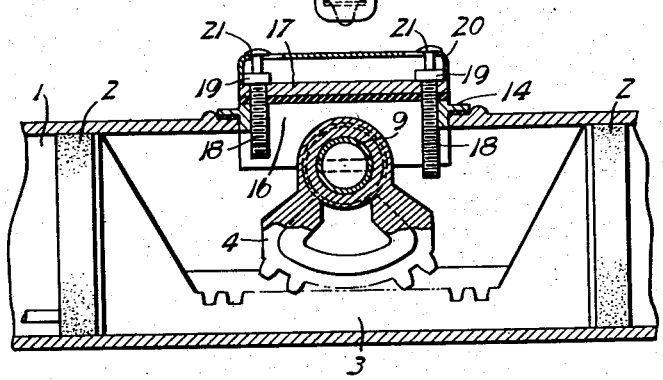
Fig. 2 is a fragmentary view, in longitudinal section, of the motor.
Figure 3:
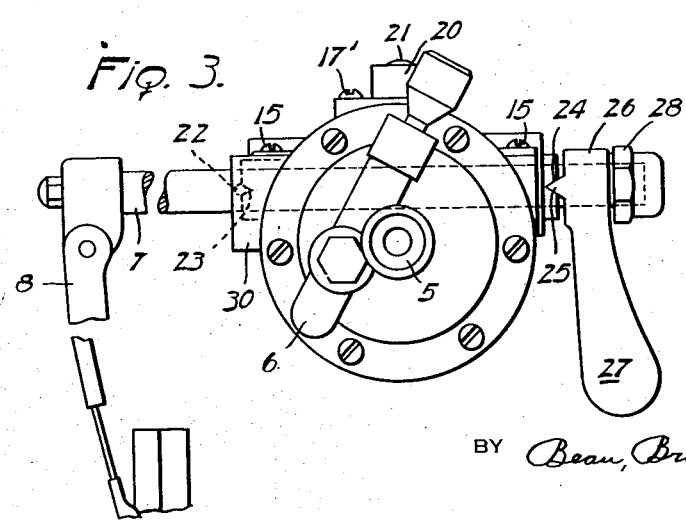
Fig. 3 is an end elevation of the motor.
Figure 4:
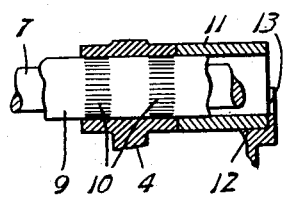
Fig. 4 is a detailed view better depicting the segmental gear die cast about the tubular shaft.

Referring more particularly to the drawing, the numeral 1 designates the motor chamber in which reciprocates a piston 2 having a rack member 3 meshing with a segmental gear 4. The operating pressure is supplied through a pressure line connection 5 and operatively applied by automatic valve mechanism 6 first to one side of the piston and then to the opposite side thereof for effecting reciprocation of the latter. The foregoing is well known in the automotive trade for oscillating a wiper actuating shaft 7 and its wiper carrying arm 8 of a windshield cleaner. Heretofore the segmental gear has been secured directly to the shaft to unite the latter definitely as a permanent part of the motor. The lengths of the motor shaft 7 have been numerous according to the various types of installation and consequently a large number of motors has been kept in stock for promptly supplying the demands as made.

The shaft is made replaceable so that one of the correct length may be substituted. To this end the segmental gear is die cast about a tubular or sleeve-like shaft 9, the latter being provided with a knurl 10 for keying the gear thereto. This hollow shaft 9, arranged transversely of the motor chamber, is supported at opposite sides of the segmental gear by a pair of self-lubricating bushings 11, such as porous bronze, which fit within seats 12 in the motor body 1 where they are prevented from endwise displacement by upstanding shoulders 13. A retaining closure 14 has like seats conformably fitting over the bushings 11 for holding the latter in place, the cap being secured in position by anchoring screws 15. The closure itself has an opening 16 through which access may be gained to the interior of the motor chamber, this opening being closed by the cover plate 17.

During high speed operation of the motor there is a tendency for the moving parts of the motor to override their normal limits of operation. To restrict such overriding action, there is provided a pair of limit pins or screws 18 arranged at opposite sides of the segmental gear for contact thereby. These limit pins may be threadedly adjustable through the cover plate 17 for regulating the extent of override, the plate being attached by suitable fasteners 17'. In order to preserve the factory setting of these limit pins, a protective cap 20 encloses the pin heads 19, the latter having undercut recesses into which the cap retaining rivets or fasteners 21 may be struck to insure the permanency of attachment and against tampering.

For detachably mounting the actuating shaft 7 the latter is provided at an intermediate point with a transverse key pin 22 designed to engage in a recess or seat 23 in the outer end of the hollow shaft. The inner end of the shaft is provided with a notch 24, herein shown as being V-shaped, to receive a tooth 25 formed on the hub 26 of a handle 27, the hub having an opening through which the actuating shaft extends. The protruding end of the actuating shaft is threaded to receive a nut 28 which secures the two interlocks at the opposite ends of the hollow shaft and thereby unites the two shafts into a unit firmly joined to the segmental gear for rocking therewith in unison.

The motor may be mounted in position on the windshield by means of spaced mounting lugs 30 or, where a single point of mounting attachment is desired, by means of a bracket 31 having a mounting sleeve 32 through which the actuating shaft extends. The bracket 31 is in such proximity to the adjacent end of the tubular shaft as to prevent accidental dislodgment of the key pin 22 should the nut 28 loosen.

The simplified, improved motor enables the wiping stroke to be readily adjusted to suit the particular windshield to which it is associated. The factory adjusted positions of the stops are secured against tampering by a novel protector arrangement which insures efficient operation.

While the foregoing description has been given in detail for the sake of clearness, it is not intended thereby to restrict the invention beyond the scope of the appended claims since the inventive principles of the invention may be incorporated in other physical embodiments without departing from the spirit of the invention.

What is claimed is:

1. A fluid motor having a casing with a chamber therein, a piston operable in the chamber by fluid pressure, the side of the casing having an opening therein giving access to the chamber, a removable closure for the opening, a transverse shaft journaled in complemental seats in the closure and casing, upstanding lips at the remote ends of the seats, bushings arranged in the seats against the lips and providing support for the shaft, and a gear member die cast upon the shaft and meshing with a rack part of the piston for being actuated thereby, the placement of the shaft in the seats locating each bushing between the fixedly mounted gear and the adjacent upstanding lip.

2. A fluid motor having a casing with a chamber therein, a piston operable in the chamber by fluid pressure, the side of the casing having a slot therein, a plate removably secured over the slot, a transverse shaft journaled in complemental seats in the closure and casing, a gear fixed to oscillate with the shaft and removable therewith as a unit from the casing, said gear meshing with a rack part of the piston to be driven thereby, and limit stops carried by the plate and extending through the slot at opposite sides of the shaft and into the path of said gear to restrict excessive movement of the latter.

3. A fluid motor having a casing with a chamber therein, a piston operable in the chamber by fluid pressure, the side of the casing having an opening therein giving access to the chamber, a removable closure for the opening, a transverse shaft journaled in complemental seats in the closure and casing, a gear fixed to oscillate with the shaft and removable therewith as a unit from the casing, said gear meshing with a rack part of the piston to be driven thereby, said closure having a window, a plate secured to the closure over the window, and limit members carried by the plate and depending into the chamber through the window for being engaged by the gear in restricting excessive oscillation of the latter.

4. A fluid motor having a casing with a chamber therein, a piston operable in the chamber by fluid pressure, the side of the casing having an opening therein giving access to the chamber, a removable closure for the opening, a transverse shaft journaled in complemental seats in the closure and casing, a gear fixed to oscillate with the shaft and removable therewith as a unit from the casing, said gear meshing with a rack part of the piston to be driven thereby, limit screws accessible from without and depending from the closure into the chamber for obstructing excessive oscillation of the gear, and a protective cap enclosing and permanently attached to the screws for maintaining the factory-setting of the latter against tampering.

5. A fluid motor having a casing with a chamber therein, a piston operable in the chamber by fluid pressure, the side of the casing having an opening therein giving access to the chamber, a removable closure for the opening, a tubular shaft journaled in complemental seats in the closure and casing, upstanding lips at the remote ends of the seats, bushings arranged in the seats against the lips and providing support for the shaft, a gear member die cast upon the shaft and meshing with a rack part of the piston for being actuated thereby, the placement of the shaft in the seats locating each bushing between the fixedly mounted gear and the adjacent upstanding lip, and a second shaft arranged in the tubular shaft and interlocked therewith to be driven thereby.

6. A fluid motor having a casing with a chamber therein, a piston operable in the chamber by fluid pressure, the side of the casing having an opening therein giving access to the chamber, a removable closure for the opening, a transverse shaft journaled in complemental seats in the closure and casing, bushings arranged in the seats to provide support for the shaft and interlocking with shoulders on the seats to hold the bushings against axial displacement, and a gear member die cast upon the shaft and meshing with a rack part of the piston for being actuated thereby, the placement of the shaft in the seats locating the bushings between the fixedly mounted gear and the seat shoulders.

ERWIN C. HORTON.
EARL V. SCHAAL.

REFERENCES CITED

The following references are of record in the file of this patent:

UNITED STATES PATENTS

| Number | Name | Date |
| --- | --- | --- |
| 2,141,953 | Hawes | Dec. 27, 1938 |
| 2,272,033 | Buchmann | Feb. 3, 1942 |